US007750312B2

(12) United States Patent
Corr et al.

(10) Patent No.: US 7,750,312 B2
(45) Date of Patent: Jul. 6, 2010

(54) METHOD AND APPARATUS FOR GENERATING IONS FOR MASS ANALYSIS

(75) Inventors: John J. Corr, Richmond Hill (CA); Jan Hendrikse, Whitby (CA)

(73) Assignee: DH Technologies Development Pte. Ltd., Singapore (SG)

( * ) Notice: Subject to any disclaimer, the term of this patent is extended or adjusted under 35 U.S.C. 154(b) by 391 days.

(21) Appl. No.: 11/680,196

(22) Filed: Feb. 28, 2007

(65) Prior Publication Data

US 2008/0067409 A1 Mar. 20, 2008

Related U.S. Application Data

(60) Provisional application No. 60/779,818, filed on Mar. 7, 2006.

(51) Int. Cl.
*H01J 27/24* (2006.01)
*H01J 49/00* (2006.01)
*B01D 59/44* (2006.01)

(52) U.S. Cl. ............................... 250/423 P; 250/423 R; 250/424; 250/282; 250/281; 250/288

(58) Field of Classification Search .............. 250/423 P, 250/423 R, 424, 288, 281, 282
See application file for complete search history.

(56) References Cited

U.S. PATENT DOCUMENTS 5,622,567 A * 4/1997 Kojima et al. ............... 118/726
6,033,741 A * 3/2000 Haruta et al. ............... 427/596
6,110,291 A * 8/2000 Haruta et al. ............... 118/726
6,930,305 B2 * 8/2005 Covey et al. ................ 250/288
6,953,928 B2 10/2005 Vestal et al.
2005/0056776 A1 * 3/2005 Willoughby et al. ........ 250/281
2006/0151691 A1 * 7/2006 Covey et al. ................ 250/290

OTHER PUBLICATIONS

Aksouh, Farouk et al, "Influence of the Laser Beam Direction on the Molecular Ion Ejection Angle in Matrix-assisted Laser Desorption/Ionization", Rapid Communications in Mass Spectrometry, vol. 9, pp. 515-518, (1995).
Ayala, Edy et al, "The Angular Distribution of Neutral Poly-alanine Molecules Produced in a Matrix-Assisted Laser Desorption/Ionization Process", Rapid Communications in Mass Spectrometry, vol. 13, pp. 792-797 (1999).

(Continued)

*Primary Examiner*—Nikita Wells
(74) *Attorney, Agent, or Firm*—Andrew T. Karnakis

(57) ABSTRACT

An apparatus and method is disclosed for reducing contamination in a mass spectrometer instrument system. The system includes an ion source at a first pressure for generating ions by laser desorption/ionization and an inlet aperture to a vacuum chamber at a second, lower pressure than the first pressure of the ion source. A sample plate within the ion source supports a sample deposited thereon and a laser can be configured to generate laser pulses striking at least a portion of the sample at an angle of incidence from about 0 to about 80 degrees to the center line of a first ion optical axis of a mass analyzer, producing a plume. A combination of the angle of incidence of the laser pulses and the distance between the sample plate and the inlet region aperture can reduce neutral contaminants in the plume from being drawn into the inlet aperture.

48 Claims, 9 Drawing Sheets

OTHER PUBLICATIONS

Johnson, R.E. et al., "Angular distribution of the ejecta in matrix-assisted laser desorption/ionization: Model dependence", International Journal of Mass Spectrometry, 177 (1998) 111-118.

Puretzky, A.A. et al, "Imaging of Vapor Plumes Produced by Matrix Assisted Laser Desorption: A Plume Sharpening Effect", Physical Review Letter, The American Physical Society, vol. 83, No. 2, pp. 444-447, Jul. 12, 1999.

Wei, Jing et al, "Desorption-ionization mass spectrometry on porous silicon", Nature, vol. 399, May 20, 1999, pp. 243-246.

* cited by examiner

METHOD AND APPARATUS FOR GENERATING IONS FOR MASS ANALYSIS

CROSS REFERENCE TO RELATED APPLICATIONS

This application claims to the benefit of U.S. Provisional Patent Application Ser. No. 60/779,818 filed Mar. 7, 2006, incorporated herein by reference

FIELD

The applicants' teachings relate to a method and apparatus for generating ions by laser desorption/ionization for analysis by mass spectrometry.

INTRODUCTION

Mass spectrometry is a prevalently used analytical method that identifies molecules in compounds based on the detection of the mass-to-charge ratio of ions generated from molecules that have been electrically charged. Numerous methods exist to ionize molecules. One such method is laser desorption/ionization.

An example of a laser desorption/ionization technique is matrix-assisted laser desorption/ionization (MALDI). In MALDI, samples are typically mixed with a UV-adsorbing compound known as a MALDI matrix, deposited on a surface, and ionized with a laser pulse. The energy of the laser is absorbed by the matrix molecules and transferred to the sample molecules, causing them to vaporize and ionize. A plume of ions is created, and the ions are then analyzed by a mass spectrometer.

Also present in the plume, along with the ions, may be contaminants, such as matrix and neutral molecules. These contaminants may also enter the mass spectrometer, stick to surfaces that they strike and form deposits. These deposits can build up over time and can degrade the performance of the mass spectrometer system. For example, deposits on electrodes can distort potentials which can lead to decreased sensitivity and resolution of the system. Furthermore, frequent cleaning may be required to remove contaminants resulting in decreased operation of the system which can be inefficient and problematic, particularly for high-throughput applications.

SUMMARY

In accordance with an aspect of the applicants' teachings, an ion source at a first pressure is provided for generating ions by laser desorption/ionization for analysis by a mass analyzer that has an inlet aperture to a vacuum chamber at a second, lower pressure than the first pressure of the ion source. The ion source comprises a surface (e.g., a sample plate) for supporting a sample deposited thereon and a laser configured to generate laser pulses striking at least a portion of the sample. In various embodiments, the laser pulses can be at an angle of incidence from about 0 to about 80 degrees to the center line of the ion path of the mass analyzer, which is referred to herein as a first ion optical axis of the mass analyzer. For example, in various embodiments, the laser pulse strikes the sample plate at an angle of greater than about 20 degrees with respect to the first ion optical axis of the mass analyzer. In various embodiments, the normal of the sample plate can be positioned at an angle from about 0 to about 45 degrees relative to the first ion optical axis of the mass analyzer. In various embodiments, the normal of the sample plate can be tilted at an angle from about 20 to about 45 degrees relative to the first ion optical axis of the mass analyzer. Upon laser desorption, a plume that can contain analyte ions of the sample and neutral contaminants is produced. Molecules enter the mass analyzer through an inlet aperture in a structure separating the inlet region from the mass analyzer.

The distance between the sample plate and the inlet region aperture is selected to reduce neutral molecules from being drawn into the inlet region of the mass analyzer due to the gas flow that results from the pressure difference between the ion source region and the mass analyzer. In various embodiments, the center of the plume is substantially directed away from the inlet region as it leaves the sample plate surface, and an electric field is applied to draw analyte ions into the inlet region of the mass analyzer. In various embodiments, the combination of the angle of incidence of the laser pulses and the distance between the sample plate and the inlet region aperture is configured such that the plume is substantially directed away from the inlet region of the mass analyzer as it leaves the sample plate surface and neutral contaminants are not drawn into the mass analyzer. The distance between the sample plate and the inlet aperture is selected so that gas drag forces resulting from the pressure difference between the ion source and the mass analyzer result in the effect of such gas drag forces being considerably reduced so as not to draw a substantial proportion of the neutral contaminants through the inlet aperture. In various embodiments, the laser pulses strike the sample plate at an angle of incidence that is greater than about 20 degrees relative to the first ion optical axis of the mass analyzer. In various embodiments, an electric field is applied to draw analyte ions into the inlet region of the mass analyzer.

In another aspect, a system is provided for generating analyte ions by laser desorption/ionization of a sample for mass analysis. The system comprises an ion source at a first pressure for generating analyte ions and a mass analyzer having an inlet aperture for receiving the analyte ions into a vacuum chamber at a second, lower pressure than the first pressure of the ion source. The ion source comprises a surface (e.g., a sample plate) for supporting a sample deposited thereon and a laser configured to generate laser pulses striking at least a portion of the sample. In various embodiments, the normal of the sample plate can be positioned at an angle from about 0 to about 45 degrees relative to a first ion optical axis of the mass analyzer, and the laser pulses can be at an angle of incidence from about 0 to about 80 degrees to the center line of the first ion optical axis of the mass analyzer. In various embodiments, the normal of the sample plate can be tilted at an angle from about 20 to about 45 degrees relative to a first ion optical axis of the mass analyzer, and the laser pulses can be at an angle of incidence from about 0 to about 80 degrees to the center line of the first ion optical axis of the mass analyzer. Upon laser desorption, a plume that can contain analyte ions of the sample and neutral contaminants is produced. The distance between the sample plate and the inlet aperture is selected so that gas drag forces resulting from the pressure difference between the ion source and the mass analyzer result in the effect of such gas drag forces being considerably reduced so as not to draw a substantial proportion of the neutral contaminants through the inlet aperture. In various embodiments, an electric field is applied to draw analyte ions into the mass analyzer.

In various aspects, a method of generating analyte ions by laser desorption/ionization of a sample for mass analysis is provided. The method comprises providing an ion source at a first pressure having a surface for supporting sample deposited thereon and a laser adapted to generate laser pulses striking at least a portion of the sample on the surface to create a plume that comprises analyte ions. The method further comprises providing a mass analyzer having an inlet aperture to a vacuum chamber at a second, lower pressure than the first pressure of the ion source for receiving at least a portion of the analyte ions, wherein the distance between the ion source and the inlet aperture is selected to reduce the influence of gas flow velocity effects that result from the difference in pressure between the ion source and the mass analyzer and that draw molecules from the source to the inlet region. In various embodiments, the surface can be a sample plate positioned at an angle from about 0 to about 45 degrees relative to a first ion optical axis of the mass analyzer, and the laser can be configured to generate pulses of energy at an angle of incidence from about 0 to about 80 degrees to the center line of the first ion optical axis of the mass analyzer. In various embodiments, the surface can be a sample plate whose normal can be tilted at an angle from about 20 to about 45 degrees relative to the first ion optical axis of the mass analyzer, and the laser can be configured to generate pulses of energy at an angle of incidence from about 0 to about 80 degrees to the center line of the first ion optical axis of the mass analyzer. In various embodiments, the method comprises providing an electric field that is applied to draw analyte ions into the mass analyzer.

These and other features of the applicants' teachings are set forth herein.

BRIEF DESCRIPTION OF THE DRAWINGS

The skilled person in the art will understand that the drawings, described below, are for illustration purposes only. The drawings are not intended to limit the scope of the applicants' teachings in anyway.

In the drawings, like reference numerals indicate like parts.

DESCRIPTION OF VARIOUS EMBODIMENTS

Figure 1:
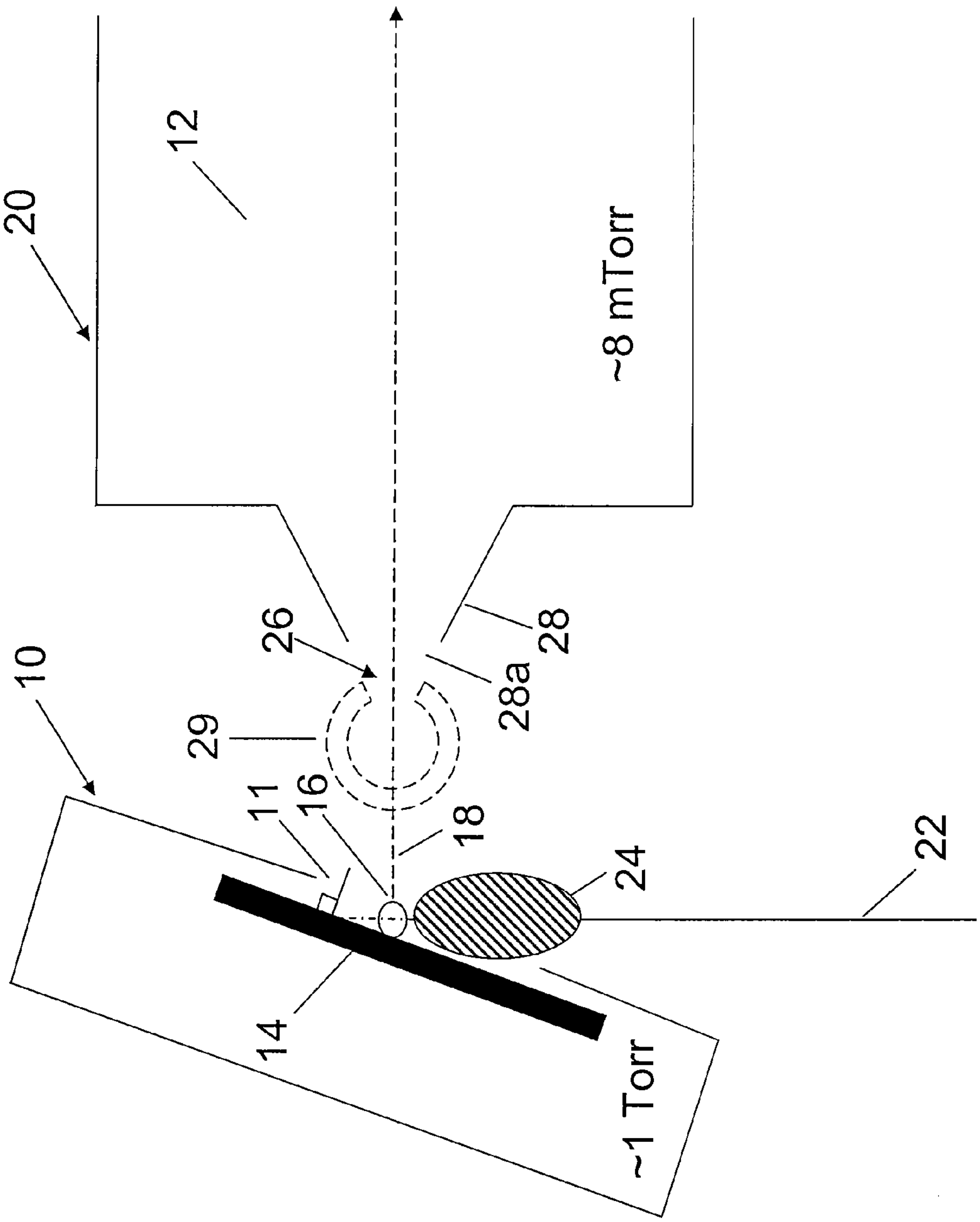
FIG. 1 schematically illustrates an ion source in accordance with various embodiments of the applicants' teachings.

It should be understood that the phrase "a" or "an" used in conjunction with the applicants' teachings with reference to various elements encompasses "one or more" or "at least one" unless the context clearly indicates otherwise. Reference is first made to FIG. 1 which schematically illustrates an ion source 10 for generating ions for mass analysis in accordance with the applicants' teachings. Gas can be bled into the ion source 10 to maintain a pressure of about 1 Torr, such that ion or neutral particle trajectories are not influenced by the impulse of the gas flow upon laser ablation. In various embodiments the pressure in the source can range between about 100 mTorr and about 2 Torr. The ion source 10 having an aperture 11 comprises a sample plate 14 that can support a sample 16 comprising an analyte. In various aspects, the sample 16 can, but is not limited to, include a MALDI matrix. As known in the art, the matrix material can be, but is not limited to, a-cyano-4-hydroxy-cinnamic acid (CHCA), 2,5-dihydroxybenzoic acid (DHB), sinapinic acid (SA), 3-hydroxypicolinic acid, nicotinic acid-N-oxide, 2,6-dihydroxyacetophenone, and ferulic acid. The normal of the sample plate 14 can be positioned at an angle from about 0 to about 45 degrees relative to a first ion optical axis 18 that corresponds to the center line of the ion path of a mass analyzer 20, and in FIG. 1 the normal of the sample plate is tilted at an angle of about 20 degrees relative to the first ion optical axis 18. An inlet region 26 of the mass analyzer 20 can comprise an inlet cone 28 having an inlet aperture 28*a* and a vacuum chamber 12, which can be at a pressure lower than the ion source pressure, for example, between about 3 and about 50 mTorr. In various embodiments, the pressure in the vacuum chamber is about 8 mTorr. A laser 22 generates laser pulses that strike at least a portion of the sample 16 on the sample plate 14 at an angle of incidence from about 0 to about 80 degrees to the center line of the first ion optical axis 18 of the mass analyzer 20. In various embodiments, the laser can be a high repetition laser and can have a pulse rate from about 500 Hz and up to about 1500 Hz. In various aspects, at least a portion of the sample can be depleted by the laser pulses of a high repetition laser in under one second. A plume 24 comprising analyte ions and neutral contaminants such as matrix material can be produced which follows the trajectory of the incident laser pulses and thus the center of the plume is directed away from the inlet region 26 of the mass analyzer 20. The cone 28 comprises an aperture 28*a* and in various embodiments the aperture 28*a* can be 4 mm in diameter. The pressure difference between the ion source 10 and the vacuum chamber 12 can produce gas flow that can induce gas drag forces through the inlet region 26 of the mass analyzer 20. Gas flow under such conditions of pressure difference can be the dominant mode of plume transport and can thus entrain analyte ions, neutral particles, and matrix molecules (either neutral or charged) in the vicinity of the inlet region 26 and draw them through the aperture 28*a* into the vacuum chamber 12 of the mass analyzer 20 as is well known in the art. The region influenced by gas flow will be referred to throughout the application as the gas drag region and is indicated by reference numeral 29 in FIG. 1.

In the present teachings, where there are regions of differential pressure, there are two physical forces available to accelerate the ions toward the inlet region 26 of the mass analyzer 20 namely, gas drag and electric fields. The two forces have distinct properties; most notably gas drag will move both charged and neutral particles whereas electric fields will move only charged particles. The combined effects of these two forces can be used to advantage to achieve high transfer efficiency for ions and maintain some degree of discrimination between ions and neutral particles.

Based on prior art imaging studies (Puretzky et al., Physical Review Letters, 1999, 83, 444-447), there is indication that some analyte ions occupy the central axis of the plume while a large portion of the matrix or other particles rapidly diverges in the radial direction. Gas drag forces immediately in front of the aperture of the inlet cone to the vacuum chamber are strong and will efficiently draw both ions and neutrals through the aperture. The pressure differential across the aperture isolating these two regions (upstream and downstream of the aperture) is sufficiently high that the mean free path between collisions is much smaller than the 4 mm orifice diameter of the aperture such that losses due to collisions with the walls defining the aperture are insignificant. The subsequent gas expansion injects both the analyte ions and neutral contaminants well into (e.g., several centimeters) the vacuum chamber at roughly sonic velocities. Positioning the sample plate close to the cone aperture assures efficient transfer of ions with the disadvantage of allowing neutral contaminants, along with analyte ions, into the mass analyzer. The target can be spaced outside the immediate influence of the gas drag region and electric fields can be used to direct the ions toward the gas flow streams, thereby presenting an opportunity to discriminate between ions and neutrals.

Optics and analyzer contamination is of particular concern for an instrument whose purpose is to conduct high sample loads. The opportunity to discriminate ions from neutral particles can be achievable in accordance with the applicants' teachings. Experiments were designed to see if a preferential transfer of ions over neutral contaminants could be achieved, taking advantage of the viscous gas drag forces, derived from the pressure differential between the ion source and the vacuum chamber (also often referred to as the Q0 optics region), and focusing electric fields. In various embodiments, a significant proportion of the neutral components of the rapidly diverging matrix plume can be pumped away by the vacuum system if positioned outside the influence of the gas drag region. The importance of these considerations is to find a reasonable balance between high transmission efficiency of analyte ions operating entirely within the gas drag region and reduced transmission efficiency with electric field focusing but maintaining some degree of discrimination between ions and neutral particles. Experiments were conducted to see if this discrimination between ions and neutrals could be achieved. Three experiments were conducted situating the target at varying distances from the cone aperture in order to move the ablation plume in and out of the gas drag region where gas drag forces exert a predominant influence. Absolute signal intensities were used as a measure of efficiency of ion transfer. Measuring the extent of neutral particle discrimination involved laser ablation of a large number of samples and tracking the deposition of neutral material on a lens located within the vacuum chamber by both visual inspection and by measuring a loss of signal intensity due to charging of the ion optics. This charging effect can create distorted potentials due to the build up of insulating layers on the ion optics over time. Defining "one sample" as the laser ablation of a portion of material from one location on the sample plate, samples were consecutively ablated until the absolute signal intensity fell to below 50% of starting conditions. The experiments were repeated on 2 different drug species using the standard CHCA matrix.

Figure 4:
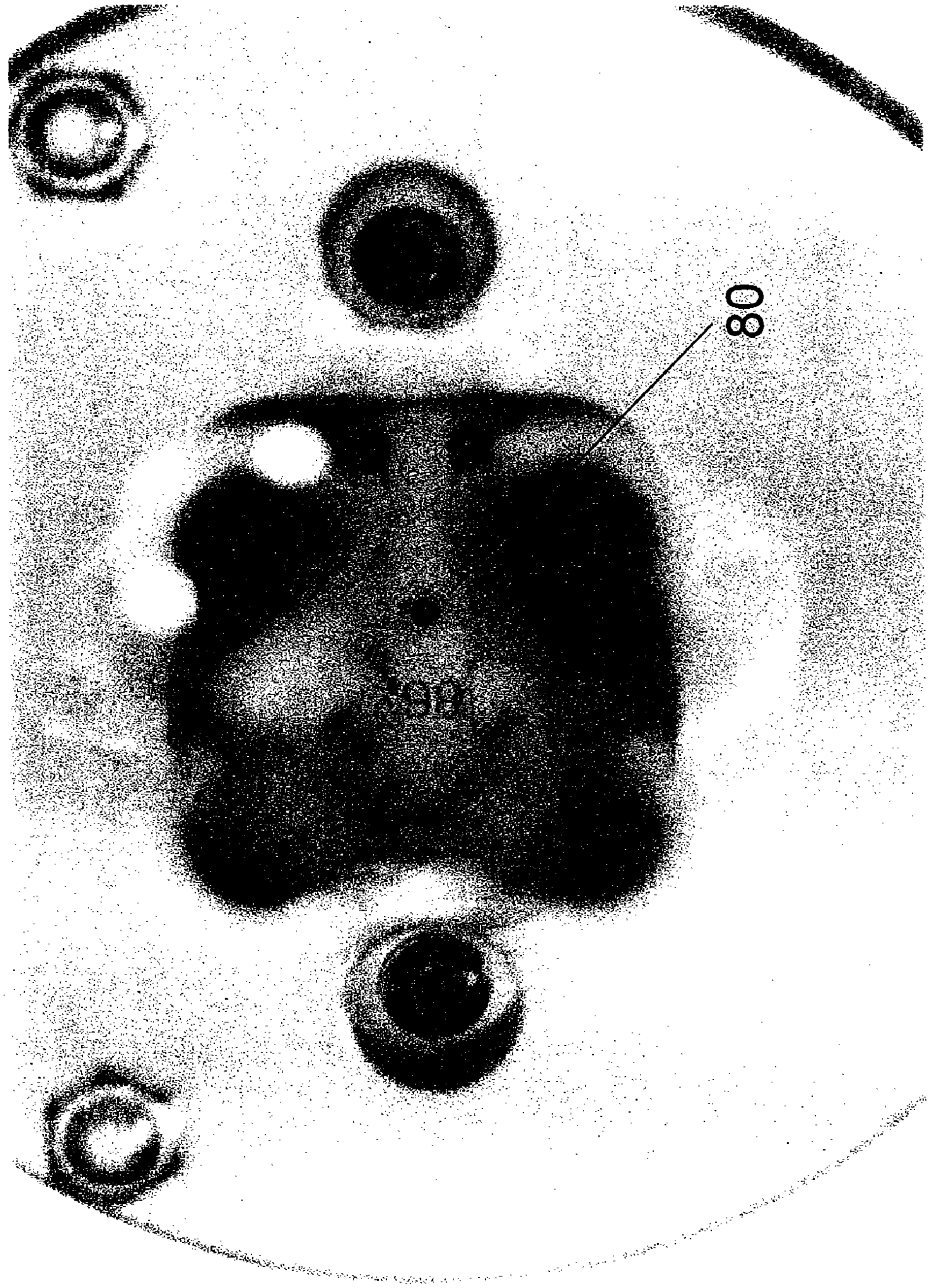
Figure 4 (Prior Art)
FIG. 4 shows a typical contamination pattern on a lens located within the vacuum region of a prior art mass analyzer having a MALDI source after approximately 30,000 samples have been analyzed.

The first experiment used laser pulses striking the sample plate at an angle of incidence of 25 degrees relative to the center line of the first ion optical axis of the mass analyzer, an inlet aperture diameter of 4 mm, and a 2 mm spacing between the sample plate and the inlet aperture, where the entire plume would be within the gas drag region and showed the highest efficiency of ion transfer. However, this configuration was also the most susceptible to contamination, showing distinctly visible deposits surrounding the inlet aperture and the quadrupole rods of the Q0 region of the vacuum chamber, and heavy contamination surrounding the exit aperture of the Q0 region after only 30,000 sample ablations at which point a 50% signal reduction was observed. Evidence of this contamination is shown in FIG. 4. No voltage potentials directing the ions toward the aperture were required as would be expected in a substantially gas flow dominated condition. The second experiment used laser pulses striking the sample plate at an angle of incidence of 62 degrees relative to the center line of the first ion optical axis of the mass analyzer, an inlet aperture diameter of 4 mm and a 4 mm spacing between the sample plate and the inlet aperture and demonstrated absolute signal intensities of 70% of that achieved in the 2 mm spacing experiment. This configuration was, however, less susceptible to contamination, showing a 50% reduction of the initial signal after an average of approximately 40,000 sample ablations. A potential difference between the sample plate and the cone of 5 to 30 V was established to drive the ions toward the cone aperture, but did not show any mass dependency, allowing the potential difference to remain at a fixed potential. A portion of the ablation plume was outside the gas drag region permitting a portion of the contaminants to be pumped away. This suggests that laser incidence angle can also affect the trajectory of the plume and thus can be a consideration in addition to the distance between the ion source and the inlet aperture. The third experiment used laser pulses striking the sample plate at an angle of incidence of 80 degrees relative to the center line of the first ion optical axis of the mass analyzer, a sample plate tilted at an angle of 20 degrees, an inlet aperture diameter of 4 mm and a 16 mm spacing between sample plate and the inlet aperture. Optics contamination was significantly reduced relative to the other experiments. Greater than 200,000 sample ablations occurred before a 50% signal reduction was recorded. The drift potential between the sample plate and the cone used higher voltages than the experiment using 4 mm spacing, a range of 50 to 150 V. This experiment demonstrated good ability to discriminate between neutrals and ions, with ions traveling through the drift region with few losses or spreading between desorption at the source and travel to the cone aperture. Neutrals were pumped away before reaching the strong vacuum draw of the gas drag region close to the aperture.

Figure 2:
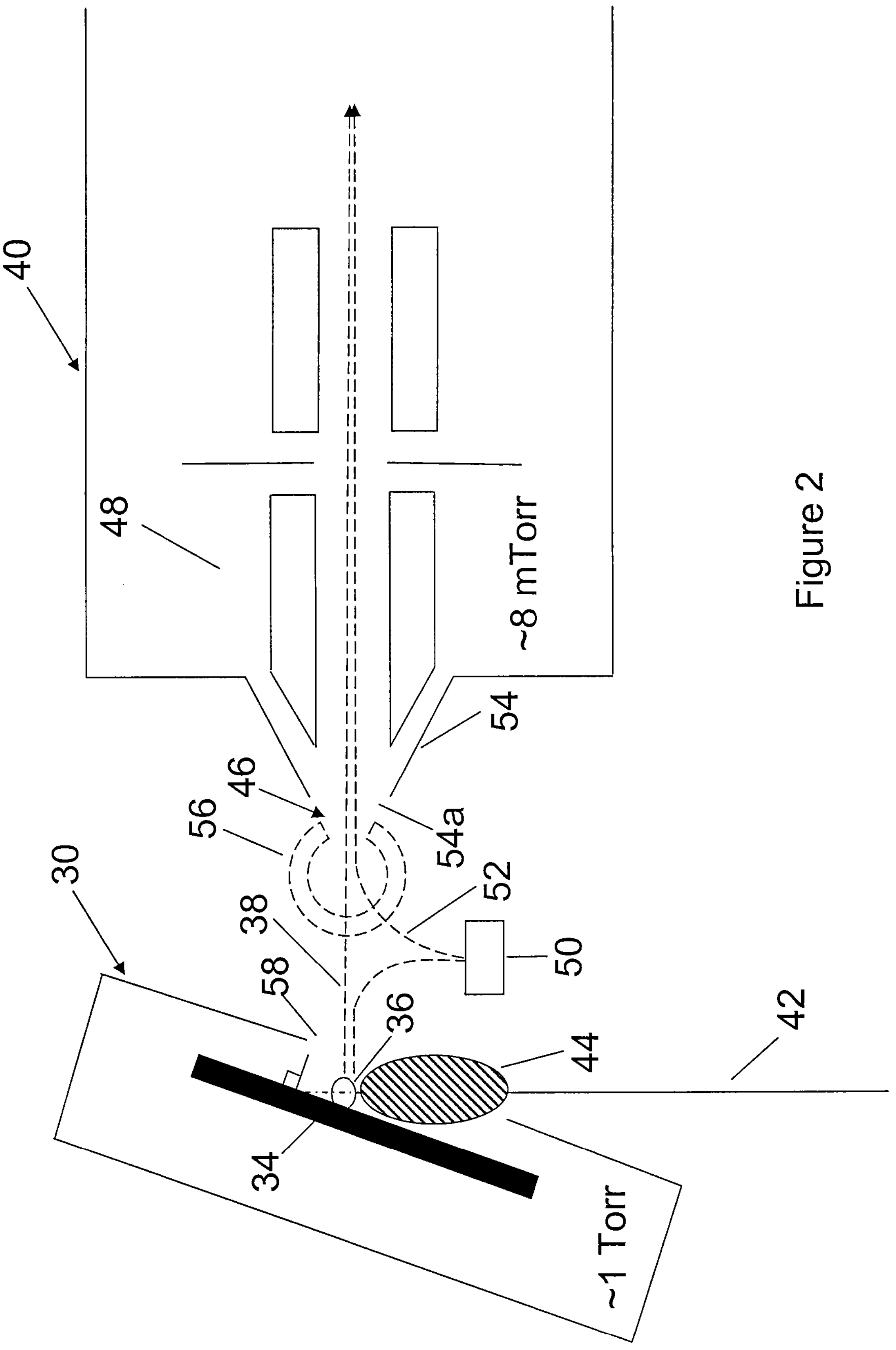
FIG. 2 schematically illustrates a mass analyzer system with a tilted sample plate in accordance with various embodiments of the applicants' teachings.

Referring to FIG. 2, in various embodiments in accordance with the applicants' teachings, a mass analysis system comprises an ion source 30 having a sample plate 34 and a mass analyzer 40 for receiving ions generated by the ion source 30. In various embodiments the pressure in the source can be between about 100 mTorr and about 2 Torr and can be about 1 Torr. The ion source comprises a source aperture 58. The sample plate 34 can contain a sample 36 comprising an analyte. In various aspects, the sample 36 can, but is not limited to, include a MALDI matrix. As known in the art, the matrix material can be, but is not limited to, a-cyano-4-hydroxycinnamic acid (CHCA), 2,5-dihydroxybenzoic acid (DHB), sinapinic acid (SA), 3-hydroxypicolinic acid, nicotinic acid-N-oxide, 2,6-dihydroxyacetophenone, and ferulic acid. The normal of the sample plate 34 can be positioned at an angle from about 0 to about 45 degrees relative to a first ion optical axis 38 that corresponds to the center line of the ion path of the mass analyzer 40 and in FIG. 2 the normal of the sample plate is tilted at an angle of about 20 degrees relative to the first ion optical axis 38. An inlet region 46 of the mass analyzer 40 can comprise a cone 54 having an aperture 54*a*. A laser 42 generates laser pulses that strike at least a portion of the sample 36 on the sample plate 34 at an angle of incidence from about 0 to about 80 degrees to the center line of the first ion optical axis 38 of the mass analyzer 40. In various embodiments, the laser 42 can be a high repetition laser and can have a pulse rate from about 500 Hz and up to 1500 Hz. In various aspects, at least a portion of the sample 36 can be depleted by the laser pulses of a high repetition laser in under one second. A plume 44 comprising analyte ions and neutral contaminants such as matrix material can be produced which follows the trajectory of the incident laser pulses and thus the center of the plume is substantially directed away from the inlet region 46 of the mass analyzer 40. In various embodiments, the gas pressure of the vacuum chamber 48 can be between about 3 mTorr and about 50 mTorr. In various embodiments, the gas pressure of the vacuum chamber 48 can be about 8 mTorr. An electric field can be generated to direct the analyte ions of interest along the first ion optical axis 38 into the inlet region 46 of the mass analyzer 40. The electric field strength can be defined by the following equation:

$$E=V/d, \qquad \text{(Equation 1)}$$

wherein E represents an electric field strength, V represents a first electrical potential applied on the sample plate 34 measured relative to the electrical potential applied on the cone 54 and d represents the distance between the sample plate 34 and the aperture 54*a* of the mass analyzer 40.

As previously mentioned, the gas drag and electric field forces available to accelerate the ions toward the inlet of the mass analyzer each have distinct properties with respect to particle movement within the analyzer system, that is, gas drag will move both charged and neutral particles whereas electric fields will move charged particles alone. Gas drag forces can have a stronger influence on charged particles than can electric field forces for the electrical potentials applied in these experiments; neutral particles are not charged and therefore are not influenced by electric field forces. In the various embodiments of the applicants' teachings, instrument geometry including spacing between the ion source and the inlet aperture can be configured such that the ablation plume can remain at a sufficient distance away from the inlet region and thus gas drag forces do not substantially draw the charged and the neutral contaminant particles into the mass analyzer. At this sufficient distance where the plume does not substantially intersect the gas drag region and thus the plume is not substantially influenced by the gas drag forces produced in the gas drag region, an electric field can be applied to separate the charged analyte ions from the neutral contaminant particles which can be present in the plume. The electric field can direct only the charged analyte ions into the vicinity of the gas drag region such that the gas drag forces can draw the analyte ions into the mass analyzer, thereby reducing contamination of the system. The combined effects of these two forces can be used to determine appropriate instrument geometry to achieve high transfer efficiency for ions while maintaining some degree of discrimination between ions and neutral particles. For example, the influence of electric field forces depends on the distance of the sample plate 34 from the inlet region 46 of the mass analyzer 40 and the potential applied on the sample plate 34 with respect to the potential applied to the cone 54. The applied electric field can be used to direct the ions toward the inlet region 46 of the mass analyzer 40. In various embodiments, the electrical potential can be from 10 V to 250 V. In various embodiments, the sample plate 34 can be positioned at least 16 mm from the inlet cone 54*a* of the mass analyzer 40, and the electrical potential on the sample plate 34 can be 60 V, providing an electric field strength of 60 V/16 mm which is 3.75 V/mm or 3,750 V/m.

The influence of gas drag on the plume is also a consideration in the determination of appropriate instrument geometry. Without being held to a particular theory, it is believed that a qualitative guide for determining instrument geometry with respect to gas drag forces can be estimated from the surface area of the aperture (e.g., 28*a*, 54*a*) in relation to the surface area of a semi-sphere centered about the inlet aperture. At any given distance from the aperture (radius "r"), the gas "pull through" effect can be approximated by the gas velocity reduction further away from the inlet aperture. This reduction can be approximated by the ratio of the area of the inlet aperture to the area of the semi-sphere at a given distance r. The surface area of the semi-sphere can be given by $2\pi r^2$.

At a distance r away from the inlet aperture, the relative gas velocity reduction can be determined as follows:

$$\frac{Aaperture}{Asemi\text{-sphere}} = \frac{\frac{\pi}{4D^2}}{2\pi r^2} = \frac{1}{8}\left(\frac{D}{r}\right)^2 \qquad \text{(Equation 2)}$$

where D is the diameter of the inlet aperture and r is the distance from the inlet aperture.

If r is one aperture diameter then velocity is reduced by ⅛ $(D/D)^2$ or ⅛ of the velocity through the inlet aperture. The velocity of the gas flow at this distance is not substantially reduced (as is the case in a prior art system with an inlet aperture diameter of 4 mm and a distance of 4 mm from the sample plate to the inlet aperture), only falling off to ⅛ of the velocity through the inlet aperture and as such the amount of contamination that would enter the mass analyzer over time is significant enough to degrade performance of the mass analyzer.

If r is 1.5 aperture diameters, then r=1.5 D and the gas velocity is reduced by ⅛ $(D/1.5D)^2$ or $1/8 \times 1/2.25 = 1/18$ of the velocity through the inlet aperture, an improvement over the case of r being equal to one aperture diameter.

Similarly, even more improvement can be achieved if r is 2 aperture diameters. In that case, r=2 D and the gas velocity is reduced by ⅛ $(D/2D)^2$ or $1/8 \times 1/4 = 1/32$ of the velocity through the inlet aperture.

Likewise, if r is 3 aperture diameters, then r=3 D and the gas velocity is reduced even further, that is, by ⅛ $(D/3D)^2$ or $1/8 \times 1/9 = 1/72$ of the velocity through the inlet aperture.

Even more improvement can be achieved in the case where r is 4 aperture diameters, then r=4 D and the gas velocity is reduced by ⅛ $(D/4D)^2$ or $1/8 \times 1/16 = 1/128$ of the velocity through the inlet aperture. At a distance where the center of the plume does not substantially intersect the gas drag region, an electric field can then be placed to separate the charged analyte ions from the neutral contaminant particles present in the plume. The electric field can direct the charged analyte ions into the vicinity of the gas drag region such that the gas drag forces can draw the analyte ions into the mass analyzer while neutrals are unaffected by the electric field and do not enter the mass analyzer, thereby reducing contamination of the system.

As will be appreciated by those of skill in the art, the foregoing analysis represents a qualitative approach in configuring instrument geometry to determine how to minimize the effect of neutrals entering the mass analyzer from the ablation plume. A more rigorous analysis of the geometry required for the plume to substantially remain outside of the gas drag region takes into effect other parameters including the angle of incidence of the laser pulses, the pressure of the source gas and the diameter of the inlet aperture and is provided below.

In the following equations, $\propto$ represents proportionality.

The velocity of the gas flowing from the source to the inlet aperture, $V_{GAS}$, is reduced, as discussed above, with the square of the radial distance, r, from the tip of the inlet aperture, and can be determined as follows:

$$V_{GAS} \propto \frac{\dot{m}}{r^2} \quad \text{(Equation 3)}$$

where $\dot{m}$ is the mass flow of source gas into the inlet aperture and r is the distance from the inlet aperture.

The mass flow can be determined from the following equation:

$$\dot{m} \propto 0.74\sqrt{\frac{M}{T_0}}D^2 p_0 \quad \text{(Equation 4)}$$

where $\dot{m}$ is the mass flow of source gas into the orifice, M is the molecular weight of the source gas, $T_0$ is the temperature of the source gas, $p_0$ is the pressure of the source gas, and D is the diameter of the inlet aperture.

Substituting Equation 4 into Equation 3 gives the following equation:

$$V_{GAS} \propto \frac{\dot{m}}{r^2} \propto 0.74\frac{D^2}{r^2}\sqrt{\frac{M}{T_0}}p_0 \quad \text{(Equation 5)}$$

Neutral contaminants contained within the laser ablation plume move at a certain velocity, $V_{PLUME}$, and beyond a given radial distance, r=R (see FIG. 9), of the gas flow dominated region, the velocity of the gas flow, $V_{GAS}$, is so slow that the neutrals are not drawn into the gas flow field and not pulled through the inlet aperture, thereby reducing contamination of the system. The relationship between $V_{PLUME}$ and $V_{GAS}$ can be described as follows:

$$AV_{PLUME} > V_{GAS} \quad \text{(Equation 6)}$$

where A is a constant of proportionality with an approximate value of 1.

Substituting Equation 5 into Equation 6 gives the following equation:

$$AV_{PLUME} > 0.74\frac{D^2}{r^2}\sqrt{\frac{M}{T_0}}p_0 \quad \text{(Equation 7)}$$

which is similar to Equation 2, where $p_0$, $T_0$, and M are constants.

Rearranging Equation 7 by lumping the constants A, M, $T_0$, and $V_{PLUME}$ into the constant B and solving for the distance r=R yields the following mathematical relation for determining the radius of the gas flow dominated region:

$$R > BD\sqrt{p_0} \quad \text{(Equation 8)}$$

Figure 9:
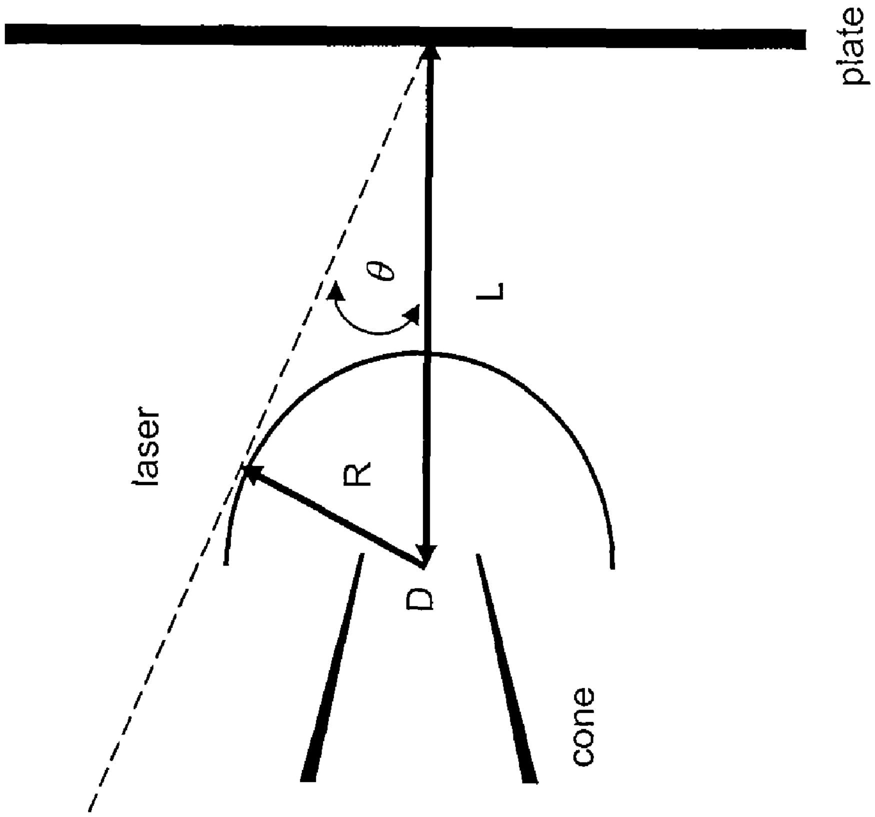
FIG. 9 schematically illustrates a mass analyzer system in accordance with various embodiments of the applicants' teachings, showing the parameters that can be varied to minimize contamination.

Referring to FIG. 9, the geometry required for the plume to substantially remain outside of the gas drag region can be determined from the following equation:

$$\sin(\theta) > R/L \quad \text{(Equation 9)}$$

where θ is the angle between the center line of the ion path of the instrument and the plume, R is a given radius of the gas flow dominated region, and L is the distance between the sample plate and the inlet aperture.

Substituting Equation 8 into Equation 9 gives the following equation:

$$\sin(\theta) > B\sqrt{p_0}D/L \quad \text{(Equation 10)}$$

where constant B is a measure of system contamination by neutrals; higher values of B indicate lower contamination per sample.

For example, in the commercially available QSTAR® system (Applied Biosystems/MDS Sciex), $p_0$=1 Torr, D=4 mm, L=4 mm, and θ=62 degrees. To configure a system that can reduce contamination better than the QSTAR system, B is chosen to be 1 $Torr^{-1/2}$ or 1, which gives the following equation:

$$\sin(\theta) > \sqrt{p_0}D/L \quad \text{(Equation 11)}$$

where the equation can be considered unitless if $p_0$ is in Torr.

Therefore, contamination can be reduced, compared to the prior art, by increasing the angle θ or by increasing the distance between the sample plate and the inlet aperture, L, or by decreasing the diameter of the inlet aperture, D, or decreasing the source pressure, $p_0$.

Decreasing the source pressure is not an efficient or practical design consideration due to the non-linear (square root) relation given by Equation 10. For example, to achieve the same effect of increasing the distance between the sample plate and the inlet aperture from 4 mm to 16 mm, one would need to reduce the source pressure by a factor of 16 (in various embodiments to 60 mTorr), which is far outside the normal region of operation. Changing the diameter of the of the inlet aperture has other deleterious effects on instrument design. For example, increasing the diameter increases the pumping load to maintain the vacuum pressure at desired levels thereby necessitating the use of large, costly pumps, while decreasing the diameter effects ion transmission efficiency and hence sensitivity. Consequently, practical considerations tend to favor making adjustments in either the angle θ or the distance between the sample plate and the inlet aperture.

For example, when the inlet aperture diameter, D, is 4 mm, $p_0$ is 1 Torr, and B is 1 $Torr^{-1/2}$, and the angle between the center line of the ion path of the instrument and the plume, angle θ, can be from 0 to 80 degrees, the distance between the sample plate and the inlet aperture, L, can be calculated, as shown in Table 1, to reduce contamination entering the system,

TABLE 1

| Angle θ | Distance, L, between the sample plate and the inlet region (mm) |
|---|---|
| 5 | 45.9 |
| 10 | 23.0 |
| 15 | 15.5 |
| 20 | 11.7 |
| 25 | 9.5 |
| 30 | 8.0 |
| 35 | 7.0 |
| 40 | 6.2 |
| 45 | 5.7 |
| 50 | 5.2 |
| 55 | 4.9 |
| 60 | 4.6 |
| 65 | 4.4 |

TABLE 1-continued

| Angle θ | Distance, L, between the sample plate and the inlet region (mm) |
|---|---|
| 70 | 4.3 |
| 75 | 4.1 |
| 80 | 4.1 |

(Note: The values below were calculated for an example in which the inlet aperture diameter, D, is 4 mm, $p_0$ is 1 Torr, and B is 1 $Torr^{-1/2}$.)

Neutral particles and matrix molecules, if a matrix is used, can also be present in the plume 44. It is generally known that the plume 44 tends to travel in a direction towards the incoming laser beam 42, (Rapid Communications in Mass Spectrometry, 1995, 9, 515-518; International Journal of Mass Spectrometry, 1998, 177, 111-118; Rapid Communications in Mass Spectrometry, 1999, 13, 792-797). As shown above, contaminants entering the mass analyzer can be reduced substantially since the geometry of various embodiments of the applicants' teachings can sufficiently separate the plume 44 and the gas drag region 56. In this manner neutral particles and matrix molecules that can be present in the plume 44 and which tend to contaminate the system are not substantially influenced by the electric field and continue to follow a trajectory directed away from the inlet region 46 of the mass analyzer 40 and towards the laser beam 42, which can be at an angle of incidence from about 0 to about 80 degrees to the center line of the first ion optical axis 38 of the mass analyzer 40.

As shown in FIG. 2, an electrode 50 can be positioned between the sample plate 34 and the inlet region 46 of the mass analyzer 40, and a second electrical potential with respect to the potential applied to the cone 54 can be applied to the electrode 50 to direct the analyte ions away from the laser beam 42 and along a second ion optical axis 52 into the inlet region 46 of the mass analyzer 40. An electrode can be a conducting element on which a potential is provided and can include, but is not limited to, a plate, ring, rod or tube. The electrode 50 can be positioned in various ways and locations, as known in the art, between the sample plate 34 and the inlet region 46 of the mass analyzer 40 to direct analyte ions into the inlet region 46 of the mass analyzer 40. In various embodiments, the second electrical potential between the potential of the cone 54 and the potential of the plate 34 can be varied. In various embodiments the second potential can be from 20 to 250 V, and, in various aspects, the electrode 50 can be at the same potential as the sample plate 34. The second electrical potential can be applied in conjunction with the electrical potential between the sample plate or independently from the first electrical potential. Similarly, the electrical potential between the sample plate and the cone can be applied independently without enabling the second electrical potential between electrode 50 and the cone 54 to direct the analyte ions into the inlet region 46 of the mass analyzer 40.

Figure 3:
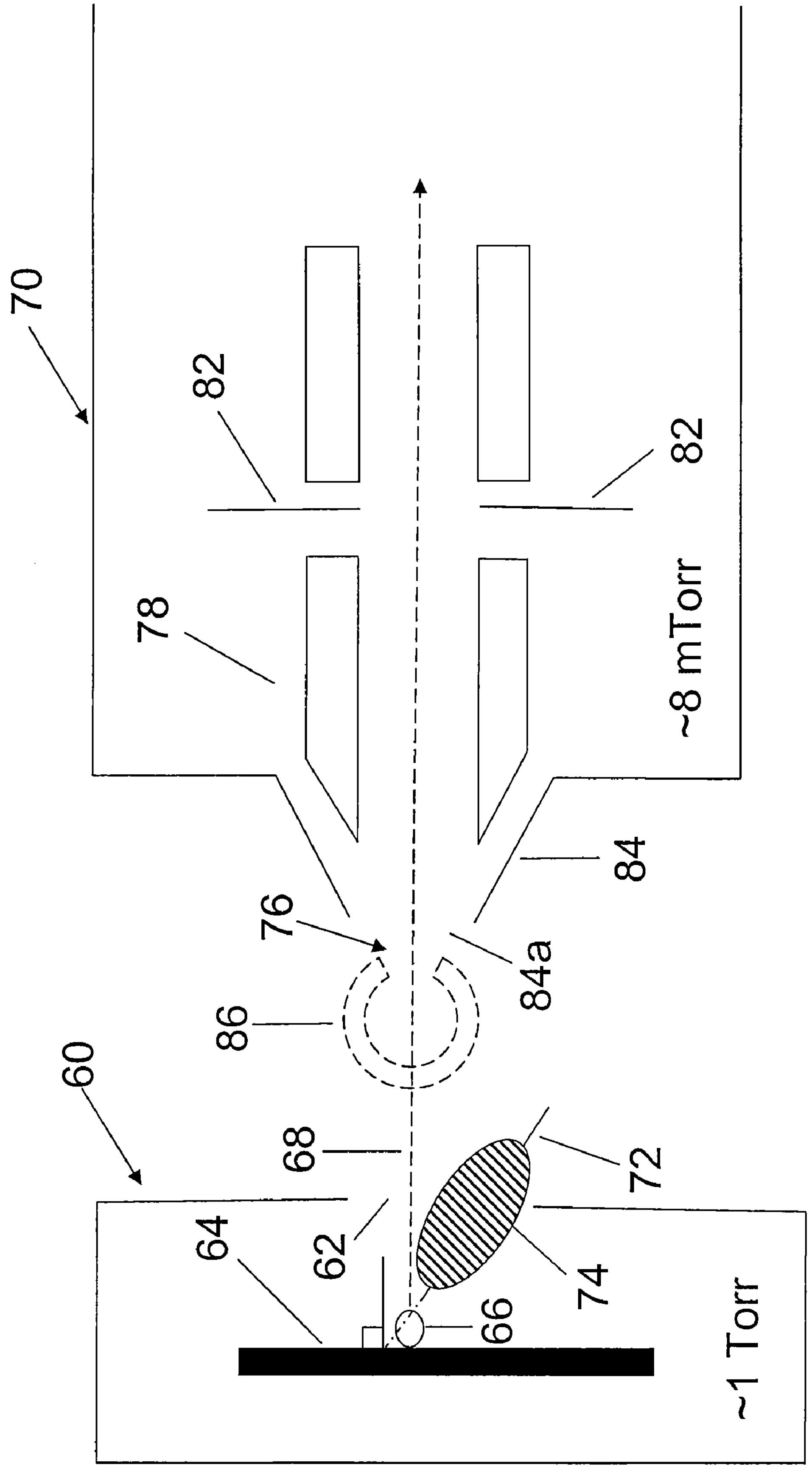
FIG. 3 schematically illustrates a mass analyzer system in accordance with various embodiments of the applicants' teachings.

Referring to FIG. 3, in various embodiments in accordance with the applicants' teachings, a mass analysis system comprises an ion source 60 having a sample plate 64 that can contain a sample 66 comprising an analyte and a mass analyzer 70 for receiving ions generated by the ion source 60. The ion source comprises an aperture 62 and in various embodiments the pressure in the source can be between about 100 mTorr and about 2 Torr and can be about 1 Torr. In various embodiments, the sample plate 64 typically is substantially orthogonal relative to a first ion optical axis 68 of the mass analyzer 70 to form a tilt angle relative to the first ion optical axis of 0 degrees. The mass analyzer 70 can comprise a cone 84 having an aperture 84*a* and a vacuum chamber 78. The pressure difference between the ion source 60 and the vacuum chamber 78 can produce gas flow that can induce gas drag forces through the inlet region 76 of the mass analyzer 70. A laser 72 generates laser pulses that strike at least a portion of the sample 66 on the sample plate 64. A laser ablation plume 74, comprising analyte ions, can be produced. A gas drag region 86 can thus entrain analyte ions, neutral particles, and matrix molecules (either neutral or charged) in the vicinity of the inlet region 76 and draw them through the aperture 84*a* into the vacuum chamber 78 of the mass analyzer 70. In the various embodiments of the applicants' teachings, instrument geometry including spacing between the ion source and the inlet aperture can be configured such that the laser ablation plume can remain at a sufficient distance away from the gas drag region and thus gas drag forces do not substantially draw the charged and the neutral contaminant particles into the mass analyzer. At this sufficient distance where the plume does not substantially intersect the gas drag region and thus the plume is not substantially influenced by the gas drag forces produced in the gas drag region, an electric field can be applied to separate the charged analyte ions from the neutral contaminant particles which can be present in the plume by directing the analyte ions of interest along the first optical axis 68 into the inlet region 76 of the mass analyzer 70. In contrast, the neutral contaminant particles will not be influenced by the electric field.

FIG. 4 shows a photo of the severe contamination 80 that can accumulate on a lens (such as the lens 82 shown in FIG. 3) within a prior art mass analyzer after approximately 30,000 samples have been analyzed in accordance with the prior art system. Since the lens typically has an aperture of only 1.5 mm, even small contaminant deposits on the lens can greatly decrease the flow of ions through the mass analyzer and therefore the contamination seen in FIG. 4 can be considered to be severe. The dark circle in the middle of the photograph is the lens aperture and the build up of contaminants that have entered the system (designated by reference numeral 80) surrounds the aperture. It should be noted that the four dark rings positioned symmetrically about the lens aperture represent the ends of the quadrupole rods in the Q0 region of the mass analyzer.

Figure 7:
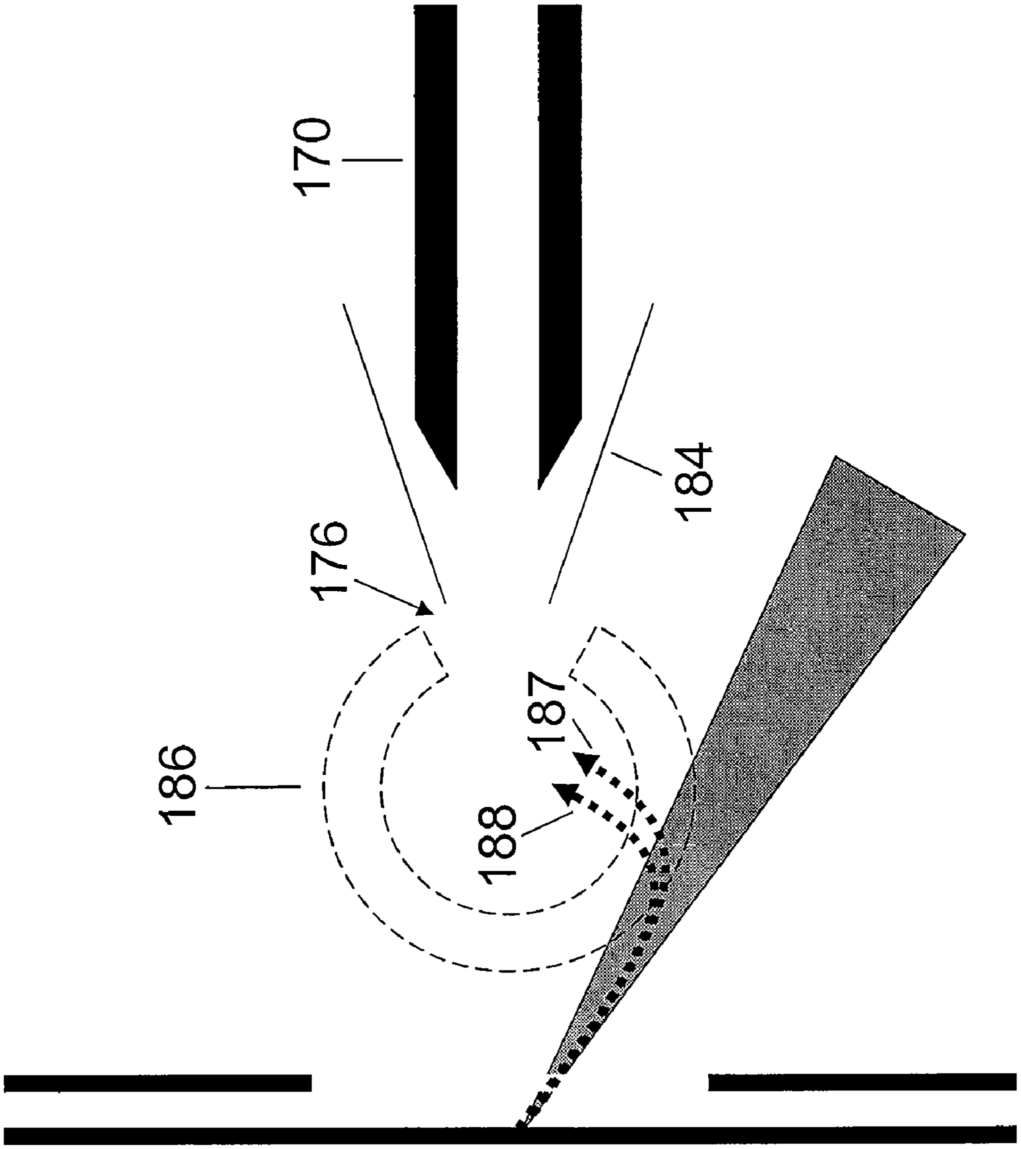
Figure 7 (Prior Art)
FIG. 7 schematically illustrates a prior art mass analyzer system, showing the influence of the gas drag region on the ions and neutrals in the plume.
Figure 8:
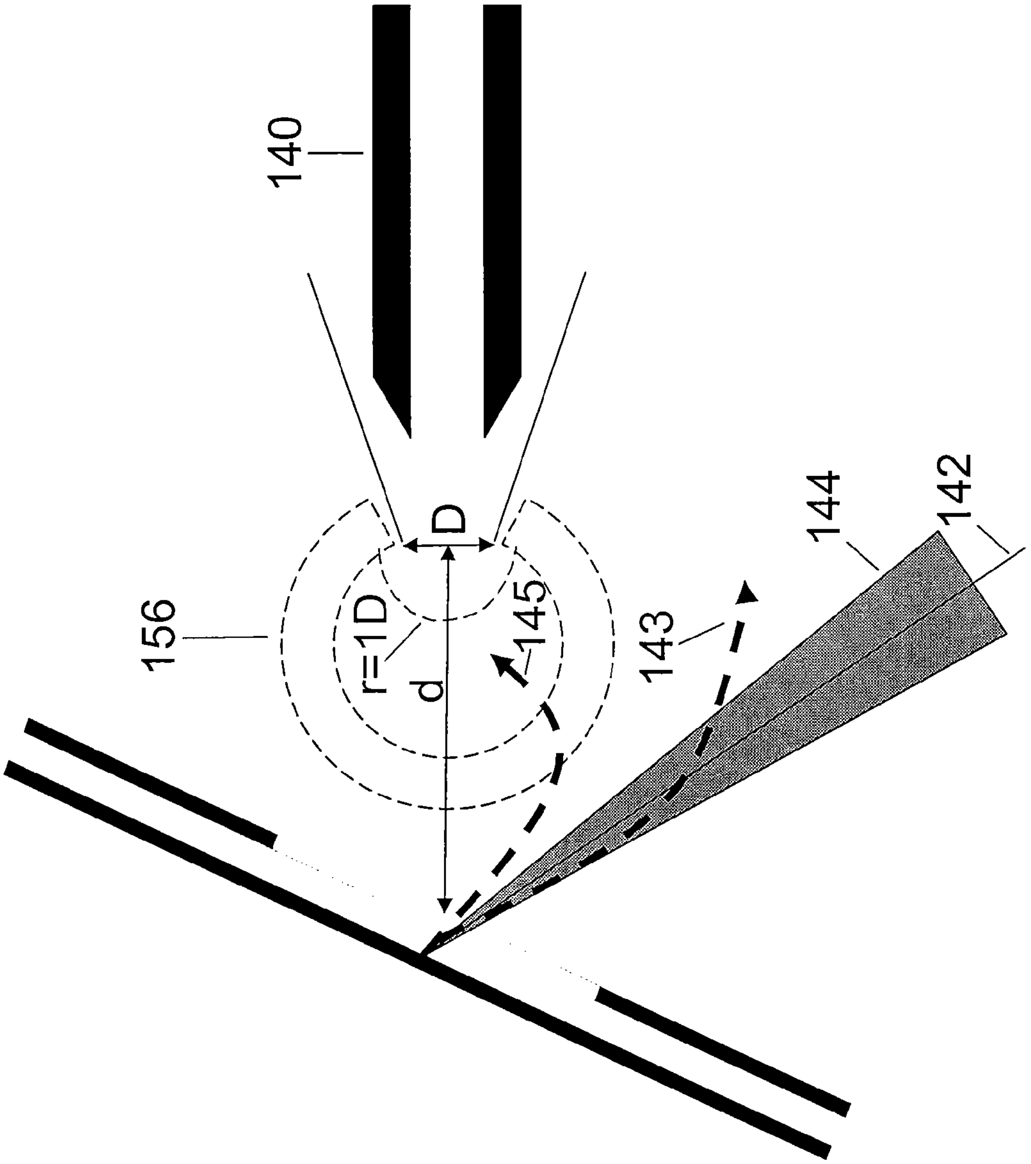
FIG. 8 schematically illustrates a mass analyzer system in accordance with various embodiments of the applicants' teachings, showing the separation of the gas drag region from the plume.

FIG. 7 illustrates the gas drag region 186 of a prior art mass analyzer that can entrain analyte ions 188, neutral particles and matrix molecules 187 in the vicinity of the inlet region 176 of the mass analyzer 170 and can pull them into the mass analyzer 170 through the cone 184. FIG. 8 illustrates that the gas drag region 156 can be separated from the plume 144 in accordance with various embodiments of the applicants' teachings. Also shown in FIG. 8 are the parameters provided in Equations 1 and 2. The analyte ions 145 can be pulled into the mass analyzer 140 and the neutral particles 143 can follow the plume 144 in the direction of the laser beam 142.

Figure 5:
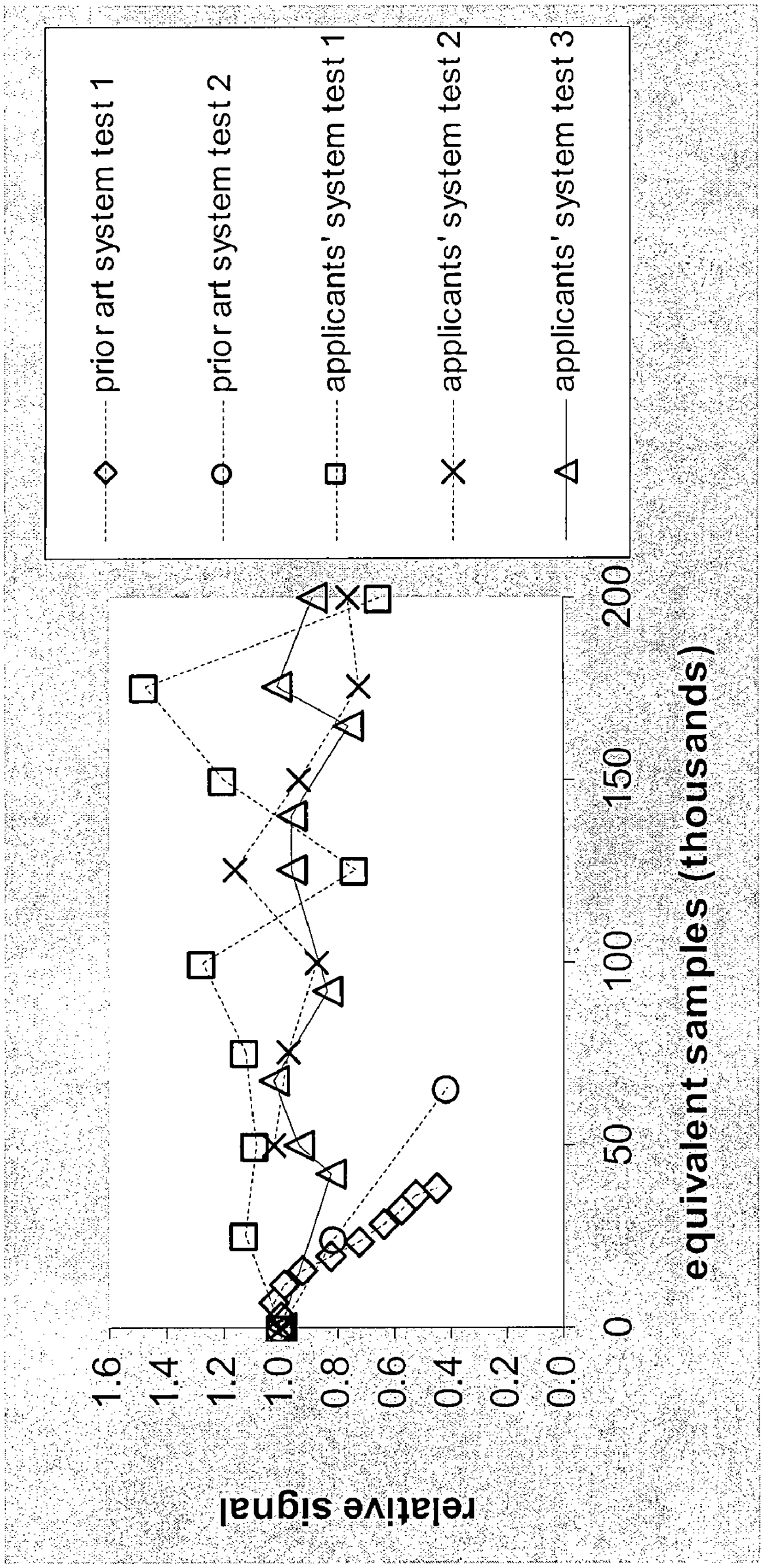
FIG. 5 compares the sensitivity of a prior art ion source and the applicants' ion source as a function of the amount of sample material analyzed.

FIG. 5 shows an example comparing the sensitivity of a prior art ion source and the applicants' ion source as a function of the number of samples processed using the compound Haloperidol. The relative signal represents signal that has been normalized to the signal obtained from a clean system in which the sample number is equal to one. As seen in FIG. 5, sensitivity decreases in the prior art system as the number of samples analyzed increases and sensitivity substantially decreases after approximately 30,000 samples are analyzed. In a system configured in accordance with the applicants' teachings, sensitivity was fairly constant even after 180,000 samples were analyzed.

Figure 6:
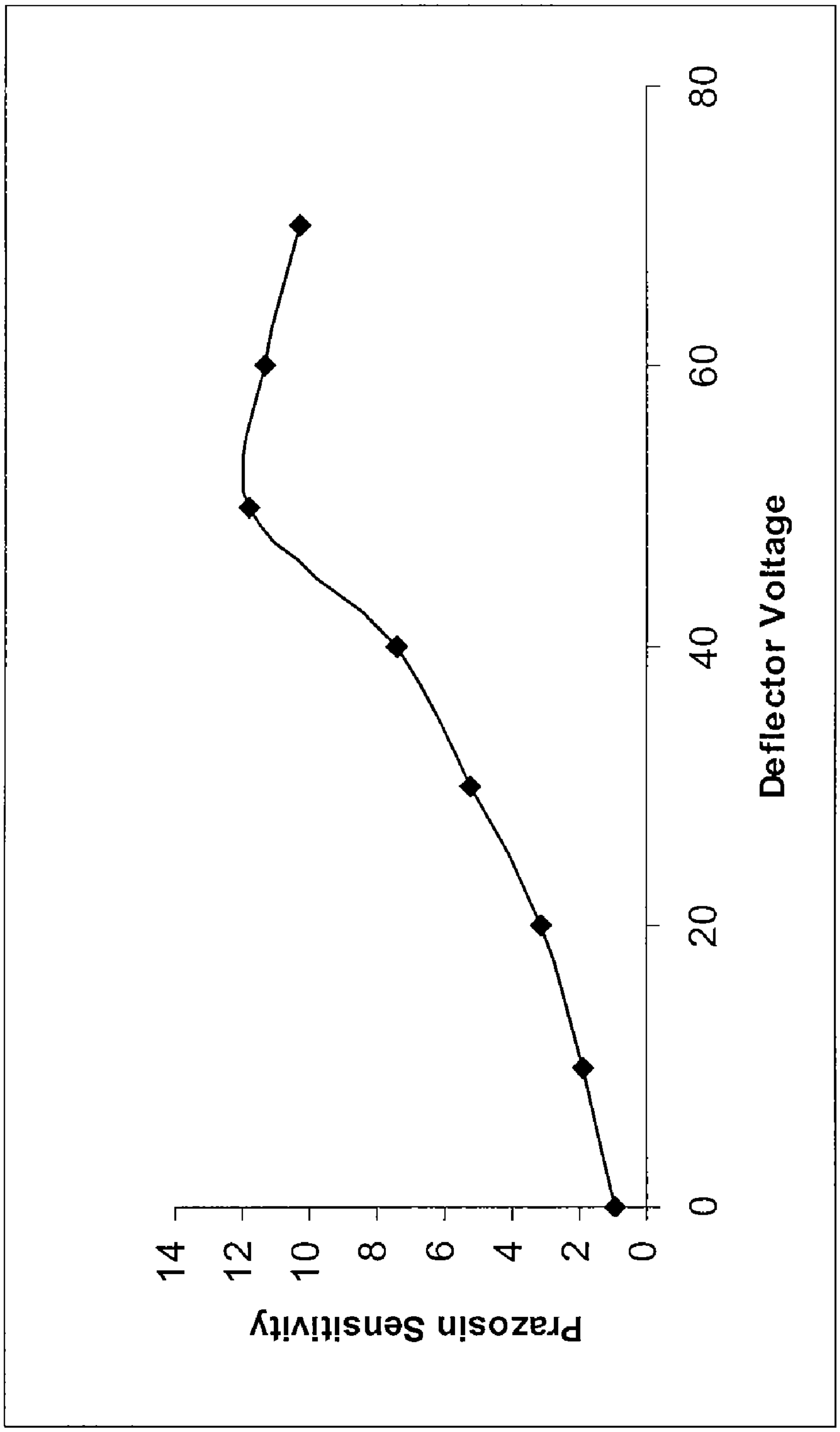
FIG. 6 shows a measurement of the instrument sensitivity as a function of the potential between an electrode and the inlet cone of a mass analyzer when the potential on the sample plate with respect to the inlet cone is 60 V in accordance with the applicants' teachings.

In a further example, samples were analyzed under the same settings for a system configured in accordance with the applicants' teachings. The following parameters were used: the pressure in the vacuum chamber was 8 mTorr, laser repetition rate was 1 kHz, pulse energy was 2.5-3.5 μJ, the voltage on the cone was 0V and the voltage on the sample plate was 60 V. The compound that was analyzed was Prazosin. FIG. 6 shows sensitivity for the analysis of Prazosin as a function of the second electrical potential applied on an electrode such as the electrode 50 shown in FIG. 2 when the first electrical potential applied on the sample plate is 60 V. The sensitivity is normalized to the sensitivity obtained with the electrode voltage at ground. The sensitivity increases until the potential on the sample plate is about the same as the potential on the electrode, in this case 60 V providing an electric field strength of 60 V/16 mm which is 3.75 V/mm or 3,750 V/m.

The following describes a general use of the applicants' teachings which is not limited to any particular embodiment, but can be applied to any embodiment. In operation, a laser, which can be, but is not limited to, a high-repetition rate solid state laser, strikes a portion of a sample, comprising an analyte, on a tilted sample plate. A plume comprising analyte ions can be generated and moves toward the incoming laser beam and away from the inlet region of the mass analyzer. The analyte ions are typically produced at pressures of about 0.2 to about 2 Torr in high pressure MALDI applications, as known in the art. Neutral and matrix particles which can be present in the plume can contaminate the system if they enter the inlet region of the mass analyzer and deposit in locations that can influence the performance of the system, generally close to ion trajectories. In the applicants' teachings, both ions and neutral and matrix particles, if present, follow an initial trajectory towards the incoming laser beam and away from the inlet region of the mass analyzer. This allows the neutrals and contaminants to deposit in places where they do not influence the ion trajectories, which can dramatically improve the signal integrity of a system that has processed a large number of samples. However, since the initial trajectories of the ions point away from the inlet region of the mass analyzer as well, the sensitivity of this system is lower. An electric field, generated by applying a first electrical potential, can direct the analyte ions into the inlet region of the mass analyzer. A second electrical potential can be applied either independently or in conjunction with the first electrical potential to direct the analyte ions in the vicinity of the gas drag region where gas drag forces can draw the analyte ions into the inlet aperture of the mass analyzer.

While the applicants' teachings are described in conjunction with various embodiments, it is not intended that the applicants' teachings be limited to such embodiments. On the contrary, the applicants' teachings encompass various alternatives, modifications, and equivalents, as will be appreciated by those skilled in the art.

In various embodiments, the distance between the sample plate and the inlet aperture can be 5 mm or greater. In various embodiments, the distance between the sample plate and the inlet aperture can be 6 mm or greater. In various embodiments, the distance between the sample plate and the inlet aperture can be 10 mm or greater. In various embodiments, the distance between the sample plate and the inlet aperture can be between 5 and 20 mm. In various embodiments, the distance between the sample plate and the inlet aperture can be between 12 and 20 mm. In various embodiments, the distance between the sample plate and the inlet aperture can be 16 mm.

In various aspects, the use of a high repetition laser can allow data to be acquired rapidly and a speed of approximately one second or less for each sample point on the sample plate can be achieved. With a high repetition laser, several thousand laser shots per sample can be obtained in a few seconds, which can dramatically improve overall precision and obtain high-throughput screening of samples. Typically, in such a high-throughput system, samples can be analyzed quicker and build up of contaminants can occur in a short period of time. For example, after analysis of approximately 30,000 samples in a prior art system, performance can be noticeably reduced such that cleaning of the system is necessary. When cleaning of the system is required, vacuum needs to be broken which can result in significant down time of the system. The applicants' teachings can reduce the frequency of system cleaning, and therefore down time, which is especially important for high-throughput applications.

In various embodiments, the sample can comprise a MALDI matrix, but a matrix-free sample can also be used, especially for samples in which the mass range is limited by matrix interference. An example of a matrix-free technique is desorption/ionization on silicon (DIOS) where analyte molecules are trapped within a porous silicon surface from which they are laser desorbed and ionized (Nature, 1999, 399, 243-246). The absence of matrix interference can allow for the analysis of small molecules below 300 m/z. Although a matrix-free sample can be used, neutrals as well as other contaminants can still be present and can form deposits that can contaminate the system.

The sample plate illustrated in the figures is representative of a typical plate, but the applicants' teachings are not limited to such a configuration. Other configurations of the sample plate as known in the art can be used. For example, the sample plate can contain topological features, as known in the art. The sample plate can be a curved, disc shape or can comprise other materials such as tape.

In various embodiments, an electrode can be a conducting element on which a potential is provided. An electrode can include, but is not limited to, a plate, ring, rod or tube.

In various embodiments, the mass analyzer can be, but is not limited to, a mass spectrometric instrument which can employ single MS, tandem (MS/MS) or multi-dimensional ($MS^n$) mass spectrometry. Mass spectrometers can include, but are not limited to, a triple quadrupole, an ion trap, a hybrid linear ion trap, a time-of-flight, quadrupole time-of-flight, an RF multipole, a magnetic sector, an electrostatic sector, and an ion mobility spectrometer. Mass analyzers can include, but are not limited to, mass filters, mass selectors, ion focusing and/or ion steering elements, for example, ion guides. Mass analyzers also can include, but are not limited to ion reflectors and/or ion fragmentors, for example, collision cells, photodissociation cells, and surface dissociation fragmentors.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the applicants' teachings have been particularly shown and described with reference to specific illustrative embodiments, it should be understood that various changes in form and detail may be made without departing from the spirit and scope of the teachings. Therefore, all embodiments that come within the scope and spirit of the teachings, and equivalents thereto, are claimed. The descriptions and diagrams of the methods of the applicants' teachings should not be read as limited to the described order of elements unless stated to that effect.

While the applicants' teachings have been described in conjunction with various embodiments and examples, it is not intended that the applicants' teachings be limited to such embodiments or examples. On the contrary, the applicants' teachings encompass various alternatives, modifications, and equivalents, as will be appreciated by those of skill in the art, and all such modifications or variations are believed to be within the sphere and scope of the invention.

The invention claimed is:

1. An ion source at a first pressure for generating ions by laser desorption/ionization for analysis by a mass analyzer, the mass analyzer having an inlet region aperture, and a vacuum chamber at a second, lower pressure than the first pressure of the ion source, comprising:

a sample plate for supporting a sample deposited on the sample plate;

a laser configured to generate laser pulses striking at least a portion of the sample on the sample plate, the laser pulses at an angle of incidence from about 0 to about 80 degrees to the center line of a first ion optical axis of the mass analyzer, adapted to produce a plume comprising analyte ions and neutral molecules; and a combination of the angle of incidence of the laser pulses and the distance between the sample plate and the inlet region aperture configured wherein the center of the plume is substantially directed away from the inlet region as the plume leaves the sample plate so as to reduce neutral molecules being drawn into the inlet region aperture due to gas flow resulting from the difference in pressure between the ion source region and the mass analyzer.

2. The ion source of claim 1 wherein the laser pulses strike the sample plate at an angle of greater than about 20 degrees with respect to the first ion optical axis of the mass analyzer.

3. The ion source of claim 1 wherein the normal of the sample plate is positioned from about 0 to about 45 degrees relative to the first ion optical axis of the mass analyzer.

4. The ion source of claim 1 wherein the normal of the sample plate is tilted at an angle from about 20 to about 45 degrees relative to the first ion optical axis of the mass analyzer.

5. The ion source of any one of claims 1, 2, 3, or 4 wherein the sample plate is positioned about 5 mm or greater from the inlet region aperture of the mass analyzer.

6. The ion source of any one of claims 1, 2, 3, or 4 wherein the sample plate is positioned about 16 mm from the inlet region aperture of the mass analyzer.

7. The ion source of any one of claims 1, 2, 3, or 4 wherein the sample plate is positioned between 5 and 20 mm from the inlet region aperture of the mass analyzer.

8. The ion source of any one of claims 1, 2, 3, or 4 wherein the sample plate is positioned between 12 and 20 mm from the inlet region aperture of the mass analyzer.

9. The ion source of claim 1 wherein an electric field is applied to draw analyte ions into the inlet region of the mass analyzer.

10. The ion source of claim 1 wherein a gas pressure of the vacuum chamber of the mass analyzer is from about 3 mTorr to about 50 mTorr.

11. The ion source of claim 1 wherein a gas pressure of the vacuum chamber of the mass analyzer is about 8 mTorr.

12. The ion source of claim 1 wherein the laser is a high repetition laser.

13. The ion source of claim 12 wherein the pulse rate of the laser is between 200 Hz and 5000 Hz.

14. The ion source of claim 1 wherein the sample includes a MALDI matrix.

15. The ion source of claim 1 wherein the mass analyzer comprises at least one of a triple quadrupole, ion trap, hybrid linear ion trap, quadrupole time-of-flight, RF multipole, magnetic sector, electrostatic sector, ion mobility spectrometer, and ion reflector.

16. A system for generating analyte ions by laser desorption/ionization of a sample for analysis by a mass analyzer, the mass analyzer having an inlet region aperture for receiving analyte ions into a vacuum chamber comprising:

an ion source having a sample plate for supporting a sample deposited on a sample plate, the ion source at a first pressure for generating analyte ions, the analyte ions being received into the vacuum chamber at a second, lower pressure than the first pressure of the ion source;

a laser configured to generate laser pulses striking at least a portion of the sample on the sample plate, the laser pulses at an angle of incidence from about 0 to about 80 degrees to the center line of a first ion optical axis of the mass analyzer, the laser adapted to produce a plume comprising analyte ions and neutral molecules; and a combination of the angle of incidence of the laser pulses and the distance between the sample plate and the inlet region aperture configured wherein the center of the plume is substantially directed away from the inlet region as the plume leaves the sample plate so as to reduce neutral molecules being drawn into the inlet region aperture due to gas flow resulting from the difference in pressure between the ion source region and the mass analyzer.

17. The system of claim 16 wherein the laser pulses strike the sample plate at an angle of greater than about 20 degrees with respect to the first ion optical axis of the mass analyzer.

18. The system of claim 16 wherein the normal of the sample plate is positioned from about 0 to about 45 degrees relative to the first ion optical axis of the mass analyzer.

19. The system of claim 16 wherein the normal of the sample plate is tilted at an angle from about 20 to about 45 degrees relative to the first ion optical axis of the mass analyzer.

20. The system of any one of claims 16, 17, 18, or 19 wherein the sample plate is positioned about 5 mm or greater from the inlet region of the mass analyzer.

21. The system of any one of claims 16, 17, 18, or 19 wherein the sample plate is positioned about 16 mm from the inlet region aperture of the mass analyzer.

22. The system of any one of claims 16, 17, 18, or 19 wherein the sample plate is positioned between 5 and 20 mm from the inlet region aperture of the mass analyzer.

23. The system of any one of claims 16, 17, 18, or 19 wherein the sample plate is positioned between 12 and 20 mm from the inlet region aperture of the mass analyzer.

24. The system of claim 16 wherein an electric field is applied to draw analyte ions into the inlet region of the mass analyzer.

25. The system of claim 16 wherein a gas pressure of the vacuum chamber of the mass analyzer is from about 3 mTorr to about 50 mTorr.

26. The system of claim 16 wherein a gas pressure of the vacuum chamber of the mass analyzer is about 8 mTorr.

27. The system of claim 16 wherein the laser is a high repetition laser.

28. The system of claim 27 wherein the pulse rate of the laser is between 200 Hz and 5000 Hz.

29. The system of claim 16 wherein the sample includes a MALDI matrix.

30. The system of claim 16 wherein the mass analyzer comprises at least one of a triple quadrupole, ion trap, hybrid linear ion trap, quadrupole time-of-flight, RF multipole, magnetic sector, electrostatic sector, ion mobility spectrometer, and ion reflector.

31. A method for generating analyte ions by laser desorption/ionization of a sample for analysis by a mass analyzer, the mass analyzer having an inlet region aperture and a vacuum chamber, the method comprising:

providing an ion source at a first pressure, the ion source having a sample plate for supporting a sample deposited on the sample plate;

providing a laser adapted to generate laser pulses striking at least a portion of the sample on the sample plate, producing a plume comprising analyte ions and neutral molecules; and providing a mass analyzer having an inlet region aperture to a vacuum chamber at a second, lower pressure than the first pressure of the ion source for receiving at least a portion of the analyte ions, wherein the combination of the angle of incidence of the laser pulses and the distance between the sample plate and the inlet region aperture is configured wherein the center of the plume is substantially directed away from the inlet region as the plume leaves the sample plate so as to reduce neutral molecules being drawn into the inlet region aperture due to gas flow resulting from the difference in pressure between the ion source region and the mass analyzer.

32. The method of claim 31 wherein the laser is configured to generate laser pulses striking at least a portion of the sample on the sample plate at an angle of incidence from about 0 to about 80 degrees to the center line of a first ion optical axis of the mass analyzer.

33. The method of claim 31 wherein the laser pulses strike the sample plate at an angle of greater than about 20 degrees with respect to a first ion optical axis of the mass analyzer.

34. The method of claim 31 wherein the normal of the sample plate is positioned from about 0 to about 45 degrees relative to a first ion optical axis of the mass analyzer.

35. The method of claim 31 wherein the normal of the sample plate is tilted at an angle from about 20 to about 45 degrees relative to a first ion optical axis of the mass analyzer.

36. The method of any one of claims 31, 32, 33, 34, or 35 wherein the sample plate is positioned from about 5 mm or greater from the inlet region aperture of the mass analyzer.

37. The method of any one of claims 31, 32, 33, 34, or 35 wherein the sample plate is positioned about 16 mm from the inlet region aperture of the mass analyzer.

38. The method of any one of claims 31, 32, 33, 34, or 35 wherein the sample plate is positioned between 5 and 20 mm from the inlet region aperture of the mass analyzer.

39. The method of any one of claims 31, 32, 33, 34, or 35 wherein the sample plate is positioned between 12 and 20 mm from the inlet region aperture of the mass analyzer.

40. The method of claim 31 wherein an electric field is applied to draw analyte ions into the inlet region of the mass analyzer.

41. The method of claim 31 wherein a gas pressure of the vacuum chamber of the mass analyzer is from about 3 mTorr to about 50 mTorr.

42. The method of claim 31 wherein a gas pressure of the vacuum chamber of the mass analyzer is about 8 mTorr.

43. The method of claim 31 wherein the laser is a high repetition laser.

44. The method of claim 43 wherein the pulse rate of the laser is between 200 Hz and 5000 Hz.

45. The method of claim 31 wherein the sample includes a MALDI matrix.

46. The method of claim 31 wherein the mass analyzer comprises at least one of a triple quadrupole, ion trap, hybrid linear ion trap, quadrupole time-of-flight, RF multipole, magnetic sector, electrostatic sector, ion mobility spectrometer, and ion reflector.

47. A mass analyzer system for generating and analyzing ions from a sample comprising:

an ion source having a sample plate for supporting a sample deposited on the sample plate, the ion source being at a first pressure;

a mass analyzer at a second, lower pressure than the first pressure of the ion source, the mass analyzer having an inlet aperture of a predetermined diameter wherein the sample plate and the inlet aperture are at a predetermined distance apart;

a laser configured to generate laser pulses striking at least a portion of the sample on the sample plate at a predetermined angle of incidence relative to the center line of a first ion optical axis of the mass analyzer, the laser adapted to produce a plume comprising analyte ions and neutral molecules; and wherein the mass analyzer system is configured so that the center of the plume is substantially directed away from the inlet region as the plume leaves the sample plate to reduce neutral molecules from being drawn into the inlet aperture in accordance with the following equation:

$$\sin(\theta) > \sqrt{p_0}D/L$$

wherein θ is the predetermined angle of incidence, $p_0$ is the pressure of the ion source in Torr, D is the predetermined diameter of the inlet aperture, and L is the predetermined distance between the sample plate and the inlet aperture.

48. The system of claim 47 wherein the predetermined distance between the sample plate and the inlet aperture is 16 mm and the predetermined angle of incidence relative to the center line of the first ion optical axis of the mass analyzer is from about 0 to about 80 degrees.

* * * * *